United States Patent
Hao et al.

(10) Patent No.: US 7,924,283 B1
(45) Date of Patent: Apr. 12, 2011

(54) TIME RELEVANCE-BASED VISUALIZATION OF DATA

(75) Inventors: Ming Hao, Palo Alto, CA (US); Tobias Schreck, Constance (DE); Umeshwar Dayal, Palo Alto, CA (US); Daniel A. Keim, Steisslingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 847 days.

(21) Appl. No.: 11/523,240

(22) Filed: Sep. 19, 2006

(51) Int. Cl.
*G06T 11/20* (2006.01)

(52) U.S. Cl. .................. 345/440; 345/440.1; 345/440.2; 345/428; 345/660; 345/619

(58) Field of Classification Search .................. 345/619, 345/440–442.2, 660; 715/275
See application file for complete search history.

(56) References Cited

U.S. PATENT DOCUMENTS

| | | |
|---|---|---|
| 3,487,308 A | 12/1969 | Johnson |
| 5,581,797 A | 12/1996 | Baker et al. |
| 5,588,117 A | 12/1996 | Karp et al. |
| 5,608,904 A | 3/1997 | Chaudhuri et al. |
| 5,623,590 A | 4/1997 | Becker et al. |
| 5,623,598 A | 4/1997 | Voigt et al. |
| 5,632,009 A | 5/1997 | Rao |
| 5,634,133 A | 5/1997 | Kelley |
| 5,659,768 A | 8/1997 | Forbes et al. |
| 5,694,591 A | 12/1997 | Du et al. |
| 5,742,778 A | 4/1998 | Hao et al. |
| 5,757,356 A | 5/1998 | Takeasaki et al. |
| 5,801,688 A | 9/1998 | Mead et al. |
| 5,828,866 A | 10/1998 | Hao et al. |
| 5,844,553 A | 12/1998 | Hao et al. |
| 5,878,206 A | 3/1999 | Chen et al. |
| 5,903,891 A | 5/1999 | Chen et al. |
| 5,924,103 A | 7/1999 | Ahmed et al. |
| 5,929,863 A | 7/1999 | Tabei et al. |
| 5,940,839 A | 8/1999 | Chen et al. |
| 5,986,673 A | 11/1999 | Martz |
| 5,999,193 A | 12/1999 | Conley, Jr. et al. |
| 6,052,890 A | 4/2000 | Malagrino, Jr. et al. |

(Continued)

FOREIGN PATENT DOCUMENTS

EP 0778001 11/1996

OTHER PUBLICATIONS

Deun et al., Multidimensional Scaling, Open and Distance Learning, Jan. 12, 2000 (pp. 1-16).

(Continued)

*Primary Examiner* — Ulka Chauhan
*Assistant Examiner* — Donna J Ricks

(57) ABSTRACT

A method for displaying a time-series data set. The method may include determining a number of data intervals for the data set, determining a data resolution for each data interval, partitioning a display space into a number of substantially equally sized partitions equal to the number of data intervals, partitioning the dataset into a number of time-relevance-based subsets equal to the number of partitions based on the currentness of the data and the desired data resolution for each partition, determining a data layout for each partition, and associating the data values for each subset with the corresponding layout. Furthermore, the first subset may consist of more current data at a first resolution and the second subset may consist of data that is less current than the first subset at a lower resolution than the first resolution.

22 Claims, 5 Drawing Sheets

U.S. PATENT DOCUMENTS

| | | | |
|---|---|---|---|
| 6,097,399 A * | 8/2000 | Bhatt et al. | 345/440 |
| 6,115,027 A | 9/2000 | Hao et al. | |
| 6,144,379 A | 11/2000 | Bertram et al. | |
| 6,211,880 B1 | 4/2001 | Impink, Jr. | |
| 6,211,887 B1 | 4/2001 | Meier et al. | |
| 6,269,325 B1 | 7/2001 | Lee et al. | |
| 6,314,453 B1 | 11/2001 | Hao et al. | |
| 6,377,287 B1 | 4/2002 | Hao et al. | |
| 6,400,366 B1 | 6/2002 | Davies et al. | |
| 6,429,868 B1 * | 8/2002 | Dehner et al. | 345/440 |
| 6,466,946 B1 | 10/2002 | Mishra et al. | |
| 6,466,948 B1 | 10/2002 | Mishra et al. | |
| 6,502,091 B1 | 12/2002 | Chundi et al. | |
| 6,584,433 B1 | 6/2003 | Zhang et al. | |
| 6,590,577 B1 | 7/2003 | Yonts | |
| 6,603,477 B1 | 8/2003 | Tittle | |
| 6,646,652 B2 | 11/2003 | Card | |
| 6,658,358 B2 | 12/2003 | Hao et al. | |
| 6,684,206 B2 | 1/2004 | Chen et al. | |
| 6,727,926 B1 | 4/2004 | Utsuki et al. | |
| 6,934,578 B2 | 8/2005 | Ramseth | |
| 7,020,869 B2 | 3/2006 | Abari et al. | |
| 7,202,868 B2 | 4/2007 | Hao | |
| 7,218,325 B1 * | 5/2007 | Buck | 345/440.2 |
| 7,221,474 B2 | 5/2007 | Hao et al. | |
| 7,313,533 B2 | 12/2007 | Chang et al. | |
| 7,567,250 B2 | 7/2009 | Hao et al. | |
| 7,714,876 B1 | 5/2010 | Hao | |
| 2002/0118193 A1 | 8/2002 | Halstead, Jr. | |
| 2002/0171646 A1 | 11/2002 | Kandogan | |
| 2003/0065546 A1 | 4/2003 | Goruer et al. | |
| 2003/0071815 A1 | 4/2003 | Hao et al. | |
| 2003/0122874 A1 | 7/2003 | Dieberger | |
| 2003/0221005 A1 | 11/2003 | Betge-Brezetz et al. | |
| 2004/0051721 A1 | 3/2004 | Ramseth | |
| 2004/0054294 A1 | 3/2004 | Ramseth | |
| 2004/0054295 A1 | 3/2004 | Ramseth | |
| 2004/0168115 A1 | 8/2004 | Bauernschmidt | |
| 2004/0210540 A1 | 10/2004 | Israel et al. | |
| 2005/0066026 A1 | 3/2005 | Chen et al. | |
| 2005/0088441 A1 | 4/2005 | Hao | |
| 2005/0119932 A1 | 6/2005 | Hao | |
| 2005/0219262 A1 | 10/2005 | Hao et al. | |
| 2006/0095858 A1 | 5/2006 | Hao et al. | |
| 2006/0241927 A1 | 10/2006 | Kadambe | |
| 2007/0225986 A1 | 9/2007 | Bowe, Jr. et al. | |
| 2009/0033664 A1 | 2/2009 | Hao et al. | |

OTHER PUBLICATIONS http://www.pavis.org/essay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

D. Keim et al "Hierarchical Pixel Bar Charts", IEEE Transactions on Visualization and Computer Graphics, vol. 8, No. 3, Jul.-Sep. 2002, pp. 255-269.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

United States Patent Office, U.S. Appl. No. 11/700,429, Office Action dated Mar. 2, 2010, pp. 1-16 and attachments.

* cited by examiner

Fig. 2A (293 DATA POINTS)
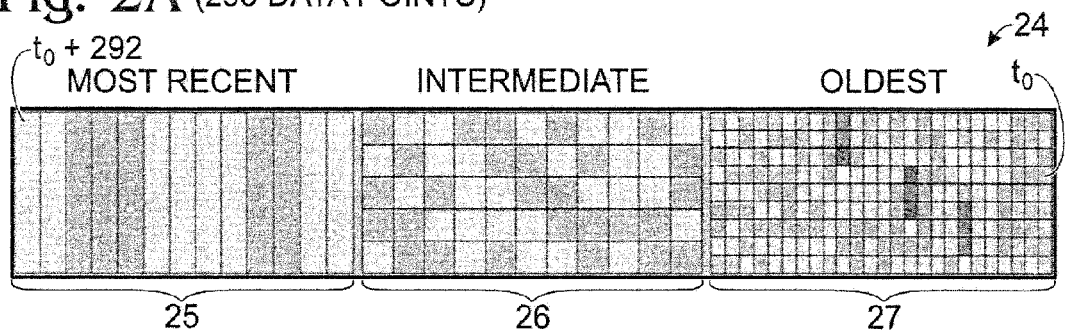
Fig. 2B (864 DATA POINTS)
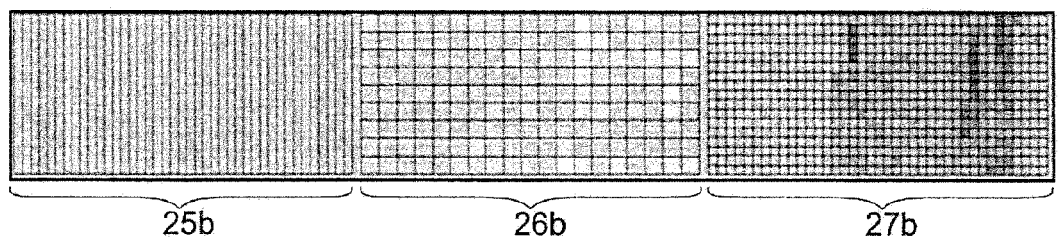
Fig. 2C (6048 DATA POINTS)
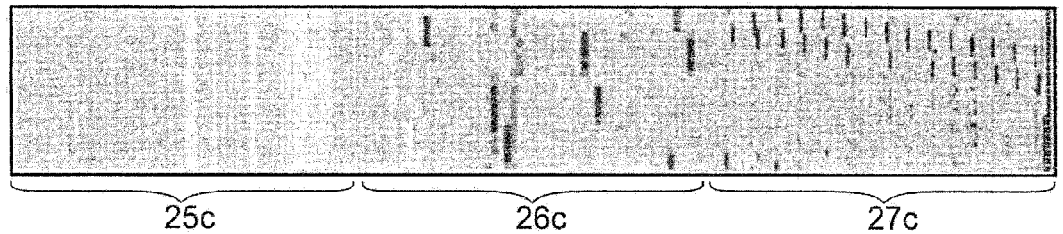
Fig. 2D (12,096 DATA POINTS)
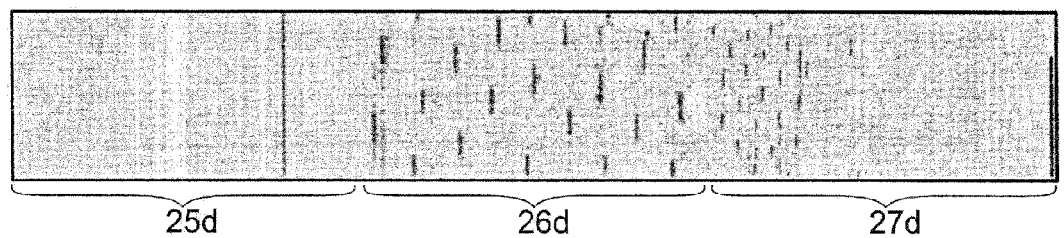
Fig. 2E (25,920 DATA POINTS)
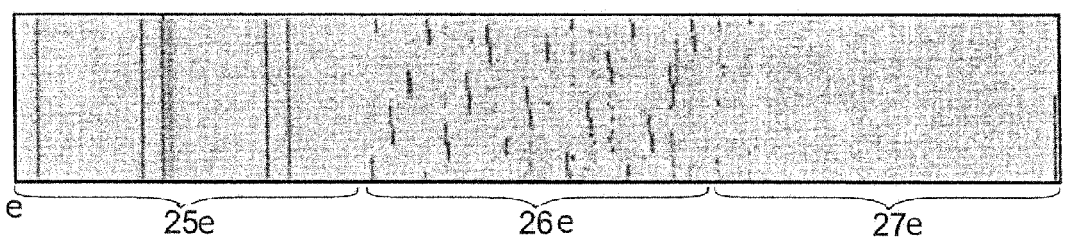

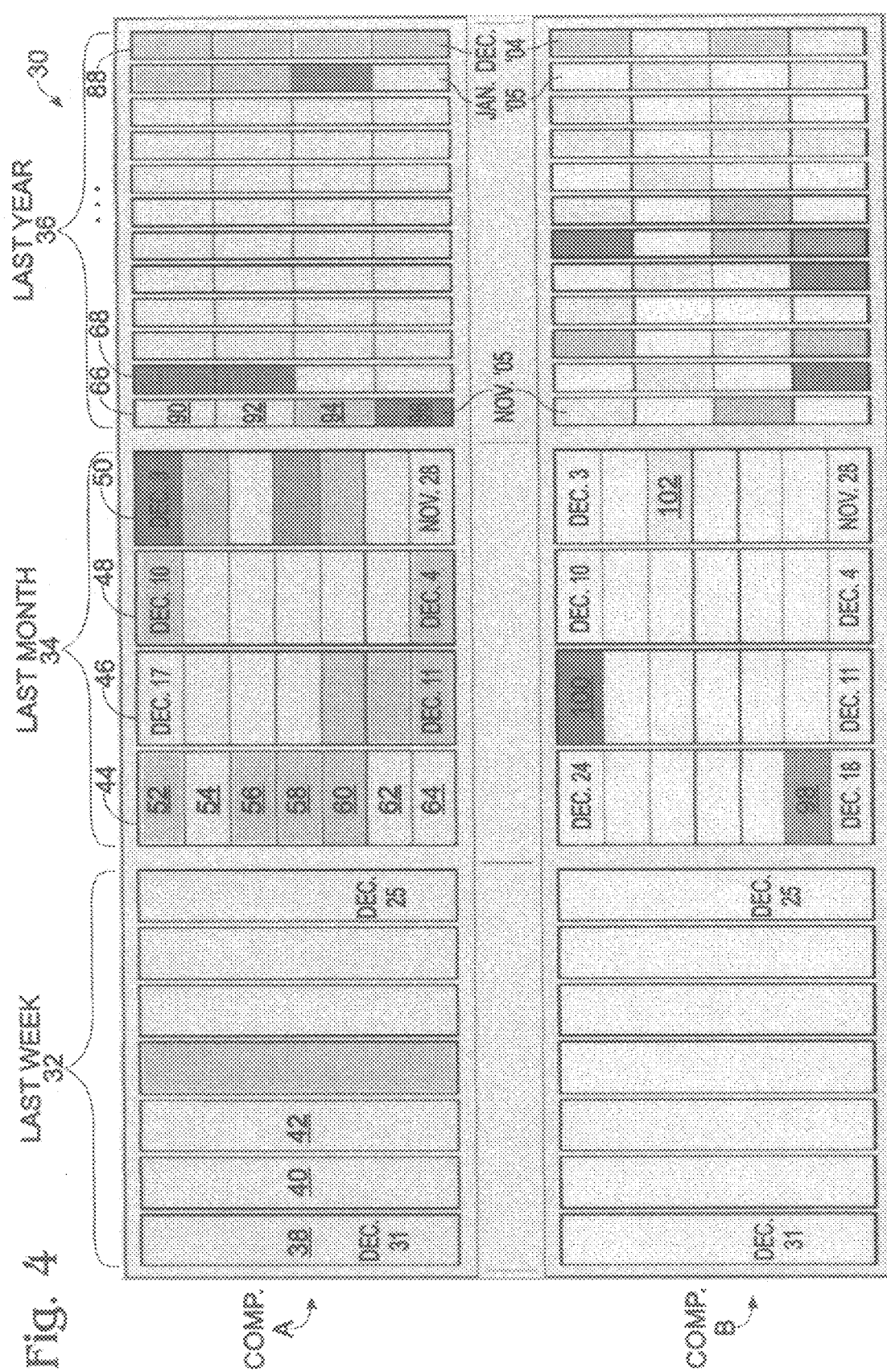

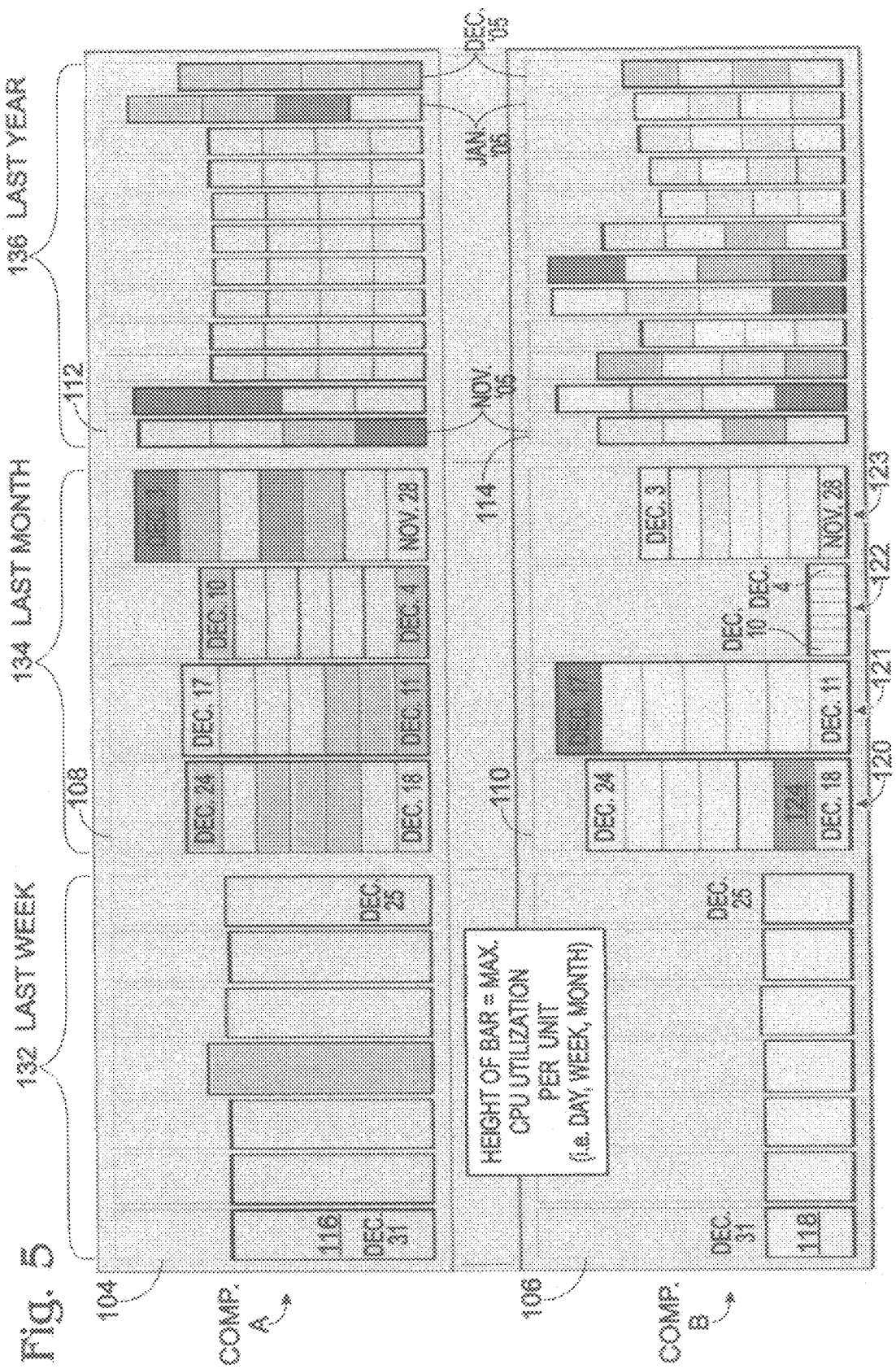

TIME RELEVANCE-BASED VISUALIZATION OF DATA

BACKGROUND

It is both common and useful to collect large amounts of data over a long period of time for a wide variety of applications. For example, data tracking stock prices, ozone levels, room temperatures, server usage, etc. can be collected and analyzed for any number of reasons—both personal and professional. However, as the number of data points grows, the sheer volume of data can make viewing the data difficult and cumbersome. Typically, large time series data is presented in a single resolution, linear fashion. For example, the fluctuations in a stock price over time are often presented by plotting evenly dispersed time points against stock price in a X-Y graph.

If, as often happens, there are more data points than can reasonably be displayed in the allocated display space (e.g. a sheet of paper, a window on a computer screen), the user is typically provided with two options: first, the data is maintained at the same resolution and the display space is enlarged (e.g. by adding another sheet of paper or by increasing the size of the window and providing the user with scroll bars to move around the window); or second, the data is provided at reduced-resolution (e.g. 1 month's worth of data may show data points at 1-day intervals while a year's worth of data may show data points at 1-week intervals.)

However, forcing users to switch between different layouts at different resolutions is cumbersome and often makes it difficult to maintain data in context. Accordingly, it would be desirable to provide improved methods and display systems for viewing long time series data in a manageable and convenient way.

BRIEF DESCRIPTION OF THE DRAWINGS

FIGS. 2A-2E are multi-resolution time series displays according to one embodiment of the invention.

FIG. 4 is another exemplary multi-resolution display depicting a calendar-based embodiment of the present invention.

FIG. 5 is still another exemplary multi-resolution display depicting a calendar-based embodiment according to an alternative or additional embodiment of the present invention.

DETAILED DESCRIPTION

The present disclosure provides methods and systems for employing time relevance-based nonlinear distortion techniques to represent large time series data in a user-friendly manner. According to one aspect of the invention, the goal is to provide the user with an easy to understand representation of a large amount of data that allows the user to view all the data in a single display, but in different contexts according to the importance of the data.

For the purposes of the present disclosure, the term "display" includes any visual representation of the data, regardless of the format in which it is delivered or otherwise made viewable. Accordingly, a display may be provided on or included as part of a computer monitor, a handheld device (PDA, cell phone, etc.) screen, paper, pamphlet, projection, hologram, watermark, etc.

Figure 1:
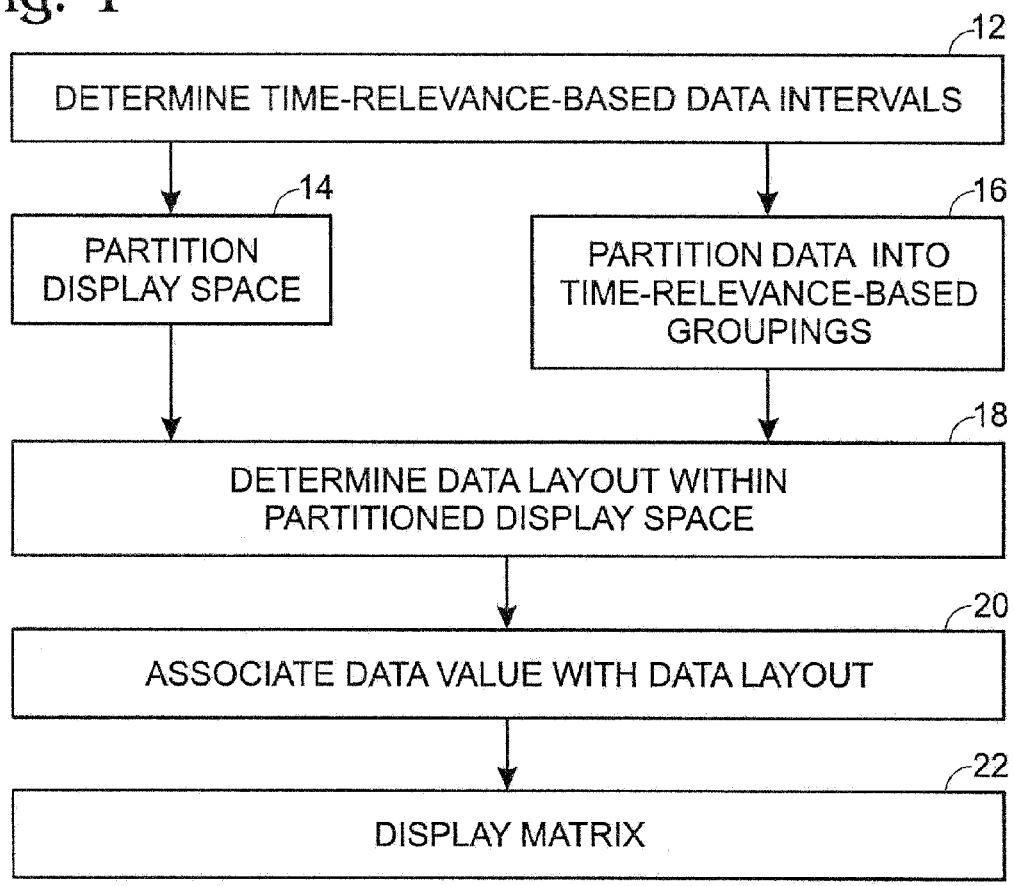
FIG. 1 provides a flowchart of one embodiment of the present invention.

FIG. 1 is a flow chart representing a simplified embodiment of a method for creating a multi-resolution (MR) time series display according to the present invention. The method of FIG. 1 can be performed by computer program code embodied in a computer-usable medium (e.g., computer memory) for commanding a computer to perform the disclosed tasks. FIG. 2A is an exemplary MR time series display that could be produced using the method provided in FIG. 1. While reviewing the present disclosure, it may be helpful to refer to FIGS. 1 and 2A together.

Referring first to FIG. 1, at 12, the number of intervals into which the entire data set is to be divided is selected. Any number of intervals may be selected, depending on the needs and desires of the user. For example, it may be considered useful for a dataset to be divided into three different time-relevance-based intervals—a first interval containing the data that is the most recent, a second interval containing the data from an intermediate time period, and a third interval containing the oldest data.

According to one embodiment, a multi-resolution index (MRi) may be created which assigns relative data weights and space weights to each of the data points in a given dataset. According to one embodiment, the relative data weight and space weights assigned are based on each data point's time-relevance. For example, a given multi-resolution display may include a Multi-Resolution index (MRi) that is defined using relative weights for data and display such as:

MR-0=(1, 1, rendering method)→1 unit of data into 1 unit of display space

MR-1=(4, 1, rendering method)→4 units of data into 1 unit of display space

MR-2=(16, 1, rendering method)→16 units of data into 1 unit of display space

Accordingly, when the MRi is defined as above, the entire time series dataset is divided into three subsets, MR-0, MR-1 and MR-2. MR-0 contains the most recent data and the data is displayed at a resolution such that each unit of display space represents only 1 unit of data. MR-1 contains intermediate time data and is displayed at a resolution such that each unit of display space represents four units of data. Finally, MR-2 contains the oldest data and is displayed at a resolution such that sixteen units of data are represented in a single unit of display space.

Of course it should be appreciated that while this example utilizes time-relevance based divisions which, for ease of description, are described using terms such "Most recent", "oldest," etc., other embodiments may be employed using similar techniques that select other data bounds by which to assign position as well as relative data weights and space weights to the data.

At 14, the total display area is divided into substantially equally sized partitions in order to provide a distinct display area for each subset of data. Turning now to FIG. 2A, it can be seen that the display area 24 is divided into three separate partitions, 25, 26, and 27. Of course it will be appreciated that alternate embodiments may employ partitions wherein some, none, or all of the partitions in the display are substantially or exactly equally sized and/or some, none, or all of the partitions in the display are of differing sizes. Furthermore, the size and shape of individual partitions may change, for example, as or if the number of data points included in a given partition changes.

Returning to FIG. 1, at 16, the entire dataset is divided proportionally according to the data weights as defined in the MRi into a number of subsets that is equivalent to the number of partitions. In the example shown in FIG. 2A, the entire dataset contains 288 values. Accordingly, the dataset must be broken up into three different datasets such that each dataset can be displayed in a different equally sized partition and at the resolution identified in the MRi. Accordingly, in FIG. 2A, the dataset is divided such that partition 25 includes 13 data values, partition 26 contains 55 data values, and partition 27 contains 220 data values.

According to one embodiment, the datasets in each of the partitions are mutually exclusive. In other words, data that is presented in partition 25 is not represented in partitions 26 and 27, data that is presented in partition 26 is not represented in partitions 25 and 27, and data that is presented in partition 27 is not represented in partitions 25 and 26.

Returning to FIG. 1, at 18, a layout is determined for the dataset within each partition. According to one embodiment, the data in each partition is displayed in a grid. Referring again to FIG. 2A, it can be seen that partition 25 is divided into a 1×13 grid, partition 26 is divided into 5×11 grid, and partition 27 is divided into a 9×25 grid. Accordingly, the display in FIG. 2A is therefore able to represent 293 data units on one single display. Of course, in this case, the dataset only contains 288 data values, so some of grid spaces in partition 27 are blank (or grey in the case of the grid in FIG. 2A).

It should be noted that the dimensionality (number of rows and columns) of each grid need not necessarily be dependant on the dimensionality of the grids in the same multi-resolution display. For example, as shown in FIG. 2A, the dimensionality of the grid may be based on the number of values to be drawn as well as the aspect ratio (proportion of height vs. width) of the input display space. The input display space may be, for example, rectangular, however, it will be understood that other shapes are possible and can be accommodated by specialized partitioning methods. According to one embodiment, a routine may be employed that optimizes the grid dimensions for (1) the minimum number of empty cells and (2) a cell aspect ratio of 1, thereby targeting square-ish cell shapes. According to some embodiments, the cell aspect ratio may not be optimized for the grid containing the most important data (e.g. the MR-0 grid in partition 25). For example, the cell aspect ratio may not be optimized in the MR-0 grid when the number of data points included may be small enough that a non-square formation (such as a single row of rectangles) is sufficient to present the data.

Accordingly, it will be appreciated that each partition may include a grid having any dimensions and that the number of grid cells and configuration thereof within a given partition may also be determined by the desired resolution and amount of data to be displayed within the partition. Accordingly, a given grid cell may have any desired shape or size.

The MR display described herein may be used to show static data, (i.e. data collected from time point A to time point B). Alternatively, the MR display may be an interactive display used to show dynamic data, (e.g. data collected in real time) by advancing the data through the display.

According to one embodiment where the display is an interactive display used to show dynamic data, the grid sizes are fixed and only a limited number of data points may be shown in the display at any time. For example, the display shown in FIG. 2A may be configured to show only the 293 most current data points. When a new data point is added to the data set, the data points are shifted and the oldest data point in partition 25 would be advanced to partition 26, where it would be cumulated with other data points according to the MRi. Similarly, the oldest data point in 26 would be advanced to partition 27, where it would be cumulated with other data points according to the MRi, and the oldest data point in partition 27 (i.e. the $294^{th}$ data point) would be removed from the display.

Alternatively, the grid sizes may be dynamic and any number of data values may be allowed to cumulate in the display. As data points are added, all of the data points in the data set would be redistributed in proportion to the data weights of the partitions, as indicated in the MRi.

FIGS. 2B-2E show an MR display accommodating the representation of increasing numbers of data points. Specifically, FIG. 2B represents 864 data points in the same sized display as that shown in FIG. 2A. However, in FIG. 2B, the 41 most recent data points are displayed in partition 25b, the 171 intermediate data points are displayed in partition 26b, and the 652 oldest data points being displayed in partition 27b. Accordingly, the resolution of each data point (i.e. the amount of space each data point or cumulated group of data points is allowed to take up) has been decreased in order to accommodate the increased number of data points in the same sized display.

FIG. 2C represents 6,048 data points with the 288 most recent data points being displayed in partition 25c, the 1152 intermediate data points being displayed in partition 26c, and the 4608 oldest data points being displayed in partition 27c.

FIG. 2D represents 12,096 data points with the 576 most recent data points being displayed in partition 25d, the 2304 intermediate data points being displayed in partition 26d, and the 9216 oldest data points being displayed in partition 27d.

FIG. 2E represents 25,920 data points with the 1234 most recent data points being displayed in partition 25e, the 4937 intermediate data points being displayed in partition 26e, and the 19749 oldest data points being displayed in partition 27e.

As shown, the partitions may be laid out, for example from left to right, with the left-most partition containing the most important data, which in some embodiments may correlate to the most recent data, at the highest resolution and the right-most partition containing the least important data, which is some embodiment may correlate to the oldest data, at the lowest resolution. Accordingly, if the data points shown in FIGS. 2A-2E were taken at 1 second intervals, and are displayed according to their time currentness, with the most recent data points being displayed at the highest resolution, the data point collected at t0 (i.e. the first time data was collected) would be represented in the bottom right-most cell. In FIG. 2A, the data point collected at t0+292 (i.e. the last, or most recent, data point) could be represented in the top left-most cell, as shown in the figure.

As stated above, FIG. 2A represents 293 data points and FIG. 2B represents 864 data points. It should be understood that the additional data points in FIGS. 2B-2E could be or include data taken before or after the time period represented in FIG. 2A or by adding new intermediate time intervals (e.g. taking measurements every quarter second instead of every second.)

Thus, in a multi-resolution display using the exemplary MRi above, each partition would include 4× as much data as the its neighbor to the left. Accordingly, as the partitions are viewed from left to right, each partition includes increasingly more data, allowing the user to view the most current data at the highest resolution, while simultaneously viewing intermediate and old data, placed in context. Of course it will be appreciated that such an approach may be utilized for any n-fold MRi.

Returning to FIG. 1, at 20, the individual cells may be color coded to indicate a data value for each cell. For example, each cell in the matrix may be filled with a color corresponding to the magnitude of the value that is represented by the cell. Of course it will be appreciated that how the data value for a given cell is determined for cumulated data values will be dependant upon the needs of the user. For example, it may be useful to indicate the highest value for the cumulated values, the lowest value for the cumulated values, the average value for the cumulated values, etc.

The color may be derived from an appropriately chosen color map, which is a function that maps the values of a normalized data range to a color value, i.e.:

$$\text{colormap}::x \rightarrow \{r,g,b\}, x \in [0 \ldots 1]$$

for the color represented in RGB color space.

As such, the cells in a matrix could range in color from red to yellow to green (and shades in between) where a red-colored cell indicates that the cell represents high or large data values, a yellow-colored cell indicates that the cell represents medium data values and a green-colored cell indicates that the cell represents low data values.

For example, if FIG. 2A is an MR display depicting CPU usage over time for a single computer, where green indicates relatively low usage and red indicates relatively high usage, it can readily be seen that the usage has remained consistently low in both the most current (partition 25) and intermediate (partition 26) time frames, but that a few periods of high activity appear in the distant time period (partition 27).

Finally, at 22, the color coded multi-resolution display is output to the user. The MR display may be output using any suitable manner and on any suitable device including, but not limited to, on a computer monitor, handheld device such as a PDA or cell phone, printed on paper, etc.

Figure 3:
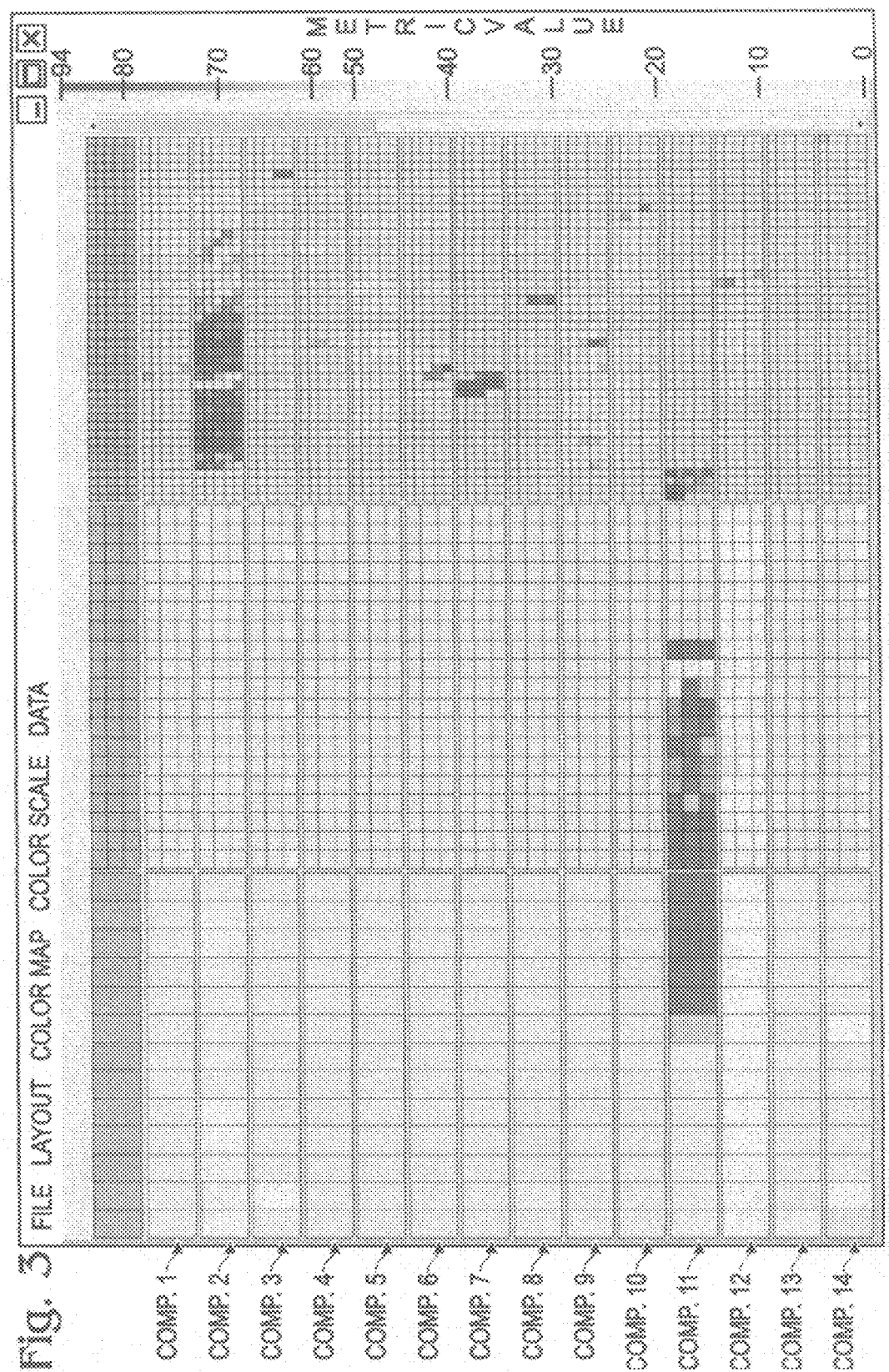
FIG. 3 is matrix of multiple multi-resolution displays aligned for comparison according to an additional or alternative embodiment of the invention.

Multiple MR displays may be displayed together in a single matrix to allow a user to compare time-series data collected from multiple sources. An example of this is shown in FIG. 3, where CPU measurements are shown for 14 different computers. The color scale on the right hand side provides a visual indication to the user of the utilization figures represented by the colors. Accordingly, it can be seen that, for example, computer 4 has relatively low utilization while computer 2 had a period of high utilization in the past, but has relatively low to moderate resolution in the recent to medium time frame. In contrast, computer 11 has had some high utilization periods fairly recently. Moreover, it can be seen that computer 12 seems to have a fairly constant level of moderate activity and computer 14 has a fairly consistent pattern of interchange of low utilization (green) and moderate utilization (yellow) dating all the way back to the beginning of the data collection time period.

According to another embodiment, instead of showing the data represented in each partition in a grid, the data may be presented using a calendar-bar-based technique. This technique uses the same steps shown in FIG. 1, except that the data is partitioned using calendar-based intervals (e.g. hour, day, week, month, year, etc) and the data is displayed accordingly using non-grid techniques.

An exemplary calendar-based matrix 30 is shown in FIG. 4, which displays CPU utilization data for two computers, A and B. The display space in FIG. 4 is divided into three partitions. These partitions may, for example, divide the data into week, month, and year-based intervals. However it should be understood that any time-based interval may be used and may be based on any time increment that presents the data in a reasonable and/or desirable manner.

In FIG. 4, the three different time-relevance-based partitions are indicated by columns 32, 34, and 36. Column 32 includes the partitions representing data from the most recent time interval, which in this particular case is CPU utilization data that was collected during the past week. Column 34 includes the partitions displaying data from the intermediate time interval, which in this case is CPU utilization data that was collected during the four week period prior to the data shown in column 32. Column 36 includes the partitions displaying data from the long time interval, which in this case is CPU utilization data that was collected during the year prior to the data shown in column 34. Accordingly, the most recent time interval will likely include the smallest amount of data, which is also the data that is considered to be the most important.

Of course it will be appreciated that while the display discussed in the present disclosure will likely include at least two time intervals, the display could include three, four, five, or as many more intervals as desired. Various factors may be used to select the desired number of intervals including, but not limited to, display screen size, relevance of the data, and the user-friendliness of the number of intervals selected.

As shown in FIG. 4, the data that will be displayed in each partition may be further divided to show individual data points or groups of data points. For example each partition in column 32 includes 7 cells arranged as vertical rectangles. Each cell represents a day's worth of data. For example, cell 38 may represent data collected for computer A on Sunday, while cell 40 represents data collected for computer A on Monday, and cell 42 represents data collected for computer A on Tuesday, etc. It will be understood that while not shown, if desired, the cells in column 32 could be further subdivided, for example into 1-hour or 4-hour increments, or as otherwise desired.

Moving one column to the right, each partition in column 34 represents a month's (in this case a month has been simplified to a 4 week period) worth of data for each computer and includes four units (e.g. vertical rectangles 44, 46, 48, and 50) which are then each subdivided into 7 cells (e.g. horizontal rectangles 52, 54, . . . 64 in rectangle 44). In this case, each unit in partition 34 represents a week's worth of data and each cell within the unit (e.g. rectangles 52-64) represents data from a day in the corresponding week.

Again moving one column to the right, each partition in column 36 represents a year's worth of data for each computer and includes 12 units (vertical rectangles 66, 68 . . . 88), which are then each subdivided into 4 cells (e.g. smaller rectangles 90, 92, 94, and 96 in unit 66). In this case, each unit represents a month's worth of data and each cell within the unit represents data from a week in the corresponding month.

It will be appreciated that any suitable layout may be selected to show the time-relevance based groupings in the partitions. For example, depending on the amount and type of data that will be displayed in a given partition, each unit may be displayed as a square, rectangle, portion of a pie chart, bar in a bar graph, etc. Moreover, this decision may be made on a partition by partition basis, as a partition that has 7 units may be more easily represented by 7 horizontal or vertical rectangles and a partition that has 24 units may be more easily represented by a 4×6 array of squares or rectangles. Accordingly, it will be understood that the particular layouts shown in the figures are intended only as examples of layouts that could be used and that no particular requirement or limitation is intended by the inclusion of these particular layouts and the exclusion of any other layout.

As with the displays shown in FIGS. 2A-2E and 3, data values may be color coded so that the user can easily associate data values, or at least, relative data values, for various points in the time-series.

For example, in FIG. 4, the datasets collected for Computers A and B have been color coded with reddish tones representing high utilization, yellowish tones representing moderate utilization and greenish tones representing low utilization. From the matrix it can be seen that computer A experiences moderate to high CPU utilization levels that are generally stable over the entire time interval. On the other hand, computer B has had a generally much lower level of CPU utilization over the 5 weeks (row B, columns 32 and 34) with a few high utilization days (i.e. days 98, 100, 102). However, when the data for computer B is viewed over the last year (row B, column 36) it can be seen that a fairly diverse utilization pattern is shown with periods of high, medium and low utilization mixed throughout the year.

An additional or alternative embodiment is shown in FIG. 5. In this embodiment, the data may be displayed such that each data unit has a maximum amount of space it can occupy. A data value associated with the data points in the data unit can be displayed by filling up a percentage of the data unit's available space. In FIG. 5, the maximum amount of space available to each data unit is shown by a light gray outline (e.g. outlines 104 and 106 in column 132, outlines 108 and 110 in column 134, and outlines 112 and 114 in column 136.) As shown, the colored portion of the rectangle within the outlines represents a value of the data points in that data unit. Accordingly, the color of each cell could represent the average CPU utilization for the data points in that cell, while the height of the unit could indicate the maximum CPU utilization value in the unit. Thus, because rectangle 116 fills up a greater portion of outline 104 than rectangle 118 in outline 106, it can be inferred from the MR display that, for that particular day, computer A had a higher maximum CPU utilization level than computer B. Furthermore, this embodiment easily allows the user to determine that while computer B had relatively low levels of use in weeks 120-123, the highest maximum usage occurred in week 121, followed by weeks 120, 122, and 123.

Accordingly, if desired, the amount of space a particular data unit takes up within its available space may be used to represent one aspect of the data in that grouping (e.g. cumulative data value, total number of shares traded in the depicted time period, highest temperature recorded during the time period) and color coding could be used to display another aspect (e.g. highest value, average data value, mean data value, average price per stock, average temperature per period, etc.)

It can also be seen by comparing rectangles 120 and 122, that the physical arrangement of the subdivisions within a rectangle need not be the same (i.e. all horizontal, all vertical, etc.). In this case, for example, the division of rectangle 122 into 7 horizontal segments would have made the individual segments too thin, so the segments were drawn vertically.

Moreover, while the embodiments in FIGS. 2-5 are shown utilizing color-coding, it should be understood, particularly with respect to the embodiment shown in FIG. 5, that some information of interest could be conveyed to the user using grey-scale, hatched, or even black and white renderings. However, the use of color coding, with or without the relative alignment of the data groupings, provides the user with a very easily understood representation of a large amount of information.

While the invention has been described with reference to the exemplary embodiments thereof, those skilled in the art will be able to make various modifications to the described embodiments without departing form the true spirit and scope of the disclosure. Accordingly, the terms and descriptions used herein are set forth by way of illustration only and are not meant as limitations. For example, while the description may include absolute terms such as "oldest," "most," "smallest," etc., it should be understood that such terms are used for descriptive purposes and should not be considered in a limiting sense.

What is claimed is:

1. A method for displaying a time-series data set comprising:
    determining, by a computer, a number of data intervals for the data set having data points, wherein the number of data intervals is at least two;
    determining, by the computer, a data resolution for each data interval;
    partitioning, by the computer, a display space into a number of substantially equally sized partitions equal to the number of data intervals;
    partitioning, by the computer, the data set into a number of time-relevance-based subsets equal to the number of partitions based on a currentness of the data and a corresponding data resolution for each partition; wherein
        a first of the subsets includes more current data at a first resolution; and
        a second of the subsets includes data that is less current than the first subset at a lower resolution than the first resolution;
    determining, by the computer, a data layout for each of the partitions, wherein a first of the partitions contains a first grid of cells displayed at the first resolution, wherein a second of the partitions contains a second grid of cells displayed at the lower resolution, wherein each of the cells represent a corresponding at least one data point in the data set, wherein the cells in the first grid displayed at the first resolution are larger in size than the cells in the second grid displayed at the second resolution;
    presenting the partitions for output in the display space;
    receiving additional data points; and
    automatically decreasing the first and second resolutions in response to receiving the additional data points such that the cells of the first grid are reduced in size, and the cells of the second grid are reduced in size, wherein automatically decreasing the first and second resolutions allows for the additional data points and the data points of the data set to be displayed in the display space without increasing a size of the display space.

2. The method of claim 1 wherein the display space is an interactive display space.

3. The method of claim 1 further comprising coloring each of the cells, wherein the color of each cell corresponds to at least a first data value associated with the at least one data point represented by the cell.

4. The method of claim 3 where the data intervals are calendar-based intervals and the cells are grouped into units that are laid out to indicate the calendar-based intervals.

5. The method of claim 4 further comprising:
    providing a maximum amount of available space for each cell grouping; and
    filling up a percentage of the available space with each corresponding cell grouping to indicate a second data value associated with the data points represented by the cells within the corresponding cell grouping.

6. The method of claim 1, wherein each of the cells in the first grid is larger than any of the cells in the second grid.

7. The method of claim 6, wherein each of the cells in the first and second grids are two-dimensional cells having sizes determined by a corresponding one of the first and second resolutions.

8. The method of claim 1, further comprising:
displaying a first number of cells in the first grid, wherein the first number is dependent upon sizes of the cells in the first grid;
displaying a second number of cells in the second grid, wherein the second number is dependent upon sizes of the cells in the second grid.

9. The method of claim 1, wherein automatically decreasing the first and second resolutions in response to receiving the additional data points is performed without user intervention.

10. The method of claim 1, further comprising:
determining different types of shapes to use to represent at least two of the partitions, wherein the type of shape to use for each of the partitions is performed on a partition-by-partition basis.

11. A method for displaying time-series data comprising:
obtaining time-series data comprising a plurality of data points;
dividing, by a computer, the data into N data subsets, wherein N is at least 2;
displaying, in a display space on a display device, the N data subsets in N corresponding partitions;
wherein:
the data subset in a first of the partitions is displayed at a first resolution in a first grid of cells; and
the data subset in a second of the partitions is displayed at a second, different resolution in a second grid of cells,
wherein the second resolution being different from the first resolution causes the cells in the first grid to have different sizes than the cells in the second grid,
receiving additional data points; and
automatically decreasing the first and second resolutions in response to receiving the additional data points such that the cells of the first grid are reduced in size, and the cells of the second grid are reduced in size, wherein automatically decreasing the first and second resolutions allows for the additional data points and the data points of the time-series data to be displayed in the display space without increasing a size of the display space.

12. The method of claim 11 further comprising assigning a color to at least some of the cells, wherein the assigned color indicates a value associated with the one or more data points represented by the cell.

13. The method of claim 12 further comprising dividing the time-series data into calendar-based intervals.

14. The method of claim 11 wherein a first of the subsets comprises data points that are more current than data points in a second of the subsets.

15. The method of claim 11, wherein the sizes of the cells in the first grid are controlled by the first resolution, and the sizes of the cells in the second grid are controlled by the second resolution.

16. The method of claim 11, wherein automatically decreasing the first and second resolutions in response to receiving the additional data points is performed without user intervention.

17. The method of claim 11, further comprising:
determining different types of shapes to use to represent at least two of the partitions, wherein the type of shape to use for each of the partitions is performed on a partition-by-partition basis.

18. A non-transitory computer-usable medium embodying computer program code for commanding a computer to create a time-series data display by performing the steps of:
obtaining a time-series data set comprising a plurality of data points;
dividing the data set into N data subsets based on time currentness of the data, wherein N is at least 2;
simultaneously displaying the N data subsets in a display space, wherein a first data subset is displayed at a first resolution and a second data subset is displayed at a second, different resolution,
wherein displaying the N data subsets comprises displaying the first data subset in a first grid of cells at the first resolution, and displaying the second data subset in a second grid of cells at the second resolution, wherein the cells in the first and second grids represent corresponding data points of the data set, and wherein sizes of the cells are determined by corresponding ones of the first and second resolutions;
receive additional data points; and
automatically decrease the first and second resolutions in response to receiving the additional data points such that the cells of the first grid are reduced in size, and the cells of the second grid are reduced in size, wherein automatically decreasing the first and second resolutions allows for the additional data points and the data points of the data set to be displayed in the display space without increasing a size of the display space.

19. The computer-usable medium of claim 18, wherein the computer program code is for commanding the computer to further perform:
determining a total display area for the display space; and
dividing the total display area into N partitions, wherein the N partitions are substantially of the same size, and wherein the N subsets are displayed in corresponding ones of the N partitions.

20. The computer-usable medium of claim 19, wherein the computer program code is for commanding the computer to further perform:
determining different types of shapes to use to represent at least two of the partitions, wherein the type of shape to use for each of the partitions is performed on a partition-by-partition basis.

21. The computer-usable medium of claim 18, wherein each of the cells in the first grid is larger than any of the cells in the second grid.

22. The computer-usable medium of claim 18, wherein automatically decreasing the first and second resolutions in response to receiving the additional data points is performed without user intervention.

* * * * *